US00RE41545E

(19) United States
(12) Reissued Patent
Young

(10) Patent Number: US RE41,545 E
(45) Date of Reissued Patent: Aug. 17, 2010

(54) TICKET AUCTION

(76) Inventor: Dale Young, 107 Stone Bridge La., Bedford Hills, NY (US) 10507-2243

(21) Appl. No.: 12/035,158

(22) Filed: Feb. 21, 2008

(Under 37 CFR 1.47)

Related U.S. Patent Documents

Reissue of:
(64) Patent No.: 7,003,485
Issued: Feb. 21, 2006
Appl. No.: 09/565,532
Filed: May 5, 2000

U.S. Applications:
(60) Provisional application No. 60/133,013, filed on May 7, 1999.

(51) Int. Cl.
*G06Q 40/00* (2006.01)

(52) U.S. Cl. ..... 705/37; 705/25; 705/26; 705/27

(58) Field of Classification Search ..... 705/25, 705/6, 27, 372
See application file for complete search history.

(56) References Cited

U.S. PATENT DOCUMENTS 6,023,685 A * 2/2000 Brett et al. ..... 705/37
6,240,396 B1 * 5/2001 Walker et al. ..... 705/26
6,496,809 B1 * 12/2002 Nakfoor ..... 705/37

FOREIGN PATENT DOCUMENTS

JP 08315046 11/1996

OTHER PUBLICATIONS

"The Fundraiser Family, Special Event" Jul. 1997.*

* cited by examiner

*Primary Examiner*—Jason Dunham

(57) ABSTRACT

This computer-based Internet ticket auctioning method pre-registers potential bidders and advises them that all bids are conditional offers to purchase tickets, and therefore cannot be lowered or canceled at will. The auction's organizer programs the computer that runs the auction with dates and locations of various events, and with auditoria layout and locations of seats to be auctioned. Each registered customer can view the layout of a particular auditorium and submit a bid for one or more seats. The bidder specifies whether a partially filled order and noncontiguous seat assignments are acceptable. The bidder is also provided with an option to engage a "proxy bid" that will increase the bid amount up to a limit set by the bidder, in order to ensure purchase of tickets. Each customer can also choose to bypass the auction process entirely, by submitting a purchase order at a high, preset price. This preset price is automatically accepted and purchase of tickets is guaranteed. At the conclusion of the auction, the computer runs a seat allocation algorithm that assigns the seats to the bidders so as to maximize the total amount realized from the auction. The seat assignment algorithm is also run periodically during the auction in order to determine which bidders have already being outbid, and to allow them to raise their bids.

18 Claims, 2 Drawing Sheets

TICKET AUCTION

Matter enclosed in heavy brackets [ ] appears in the original patent but forms no part of this reissue specification; matter printed in italics indicates the additions made by reissue.

CROSS REFERENCE TO RELATED APPLICATIONS

This application *is a Reissue application of U.S. Ser. No. 09/565,532, filed May 5, 2000, now U.S. Pat. No. 7,003,485, granted Feb. 21, 2006, which* claims the priority benefits of [copending] U.S. Provisional Application No. 60/133,013, filed on 7 May 1999.

TECHNICAL FIELD

This invention relates to the field of on-line auctions, and particularly to on-line auctions of tickets for entertainment events.

BACKGROUND OF THE INVENTION

Seats for theatrical, musical, sporting, and other events are typically sold based on a pricing system that uses broad categorizations for seat locations. For example, all orchestra seats in a theater usually are uniformly priced for a given performance. The same system applies to sporting events. All tickets for movies are priced uniformly for each showing, though discounts for certain classes of people, e.g., students and senior citizens, may be available.

This simple system disregards the fact that within each broad category some seats are more valuable than others. Moreover, setting ticket prices well in advance of a performance, and keeping ticket prices constant, often misjudges the demand and fails to optimize pricing. Not surprisingly, tickets for a given performance often sell out upon their release; for ongoing events, patrons often have to wait too long to get desired tickets. These are reliable indicators that the tickets are underpriced, i.e., that the total amount collected by the event's producer/organizer is lower than could otherwise be achieved. Alternatively, if the ticket prices are set too high, many tickets may remain unsold, also reducing the total amount collected by the event's producer, despite higher average ticket price. Because producers, as most people, prefer a bird in hand to two in the bushes, tickets are practically always underpriced. Occasionally, the sub-optimal pricing benefits the consumer; more often than not, however, it benefits the illegal re-sellers, also known as "scalpers."

Several on-line auction methods designed to optimize revenue from ticket sales, as well as to solve other problems, have been described. One method is the subject of U.S. Pat. No. 6,023,685 issued 8 Feb. 2000 to Brett et al. ("Brett"hereinafter), hereby incorporated by reference as if fully described herein. Brett also describes several other auctioning systems and methods.

According to Brett, a central computer runs a ticket auction, receiving and evaluating bids sent by bidders from remote terminals. Although the bids are for seats in a single section with all seats subject to the same minimum bid requirement, each seat is also preassigned a preferential rank. After a predetermined bidding period, the central computer associates the seats with acceptable bids based on the bid amounts and the preferential ranks of the seats, presumably with higher bids being assigned higher ranking seats. During the bidding period, however, the bidders can cancel, raise, or lower bids at will. Brett's method also provides for ensuring contiguous grouping of seats subject to a single bid.

Brett's method has several disadvantages. First, allowing bidders to lower or even cancel their bids wreaks havoc with the auctioning process. For example, one bidder can be outbid by another, and so notified; then, the higher bidder can cancel the bid, making the first bid acceptable, despite the notification. It is not even clear at what point a bidder becomes legally obligated to pay for the tickets. In sum, allowing cancellation and lowering of the bids creates uncertainty, even chaos.

Another disadvantage is that remote auctions differ from live auctions. (By "remote auctions" I mean auctions where bidding is done online, through telephone, or by similar means.) In a remote auction, there is no reason to conduct the auction in a short period of time, with each bidder responding (or choosing not to respond) to other bidders substantially in real time; remote auctions can, and often do, last for days, even weeks. Indeed, it would be difficult to conduct a widely accessible remote auction in real time because of potential for telecommunication equipment overload caused by simultaneous attempts of multiple bidders to place or change their bids. A bidder in a remote auction would have to check the status of the bids periodically to avoid being outbid. This is an inconvenience; moreover, because most bidding will probably be done towards the conclusion of the auction, telecommunication equipment can still become overloaded, preventing the bidder from raising his bid.

Yet another problem with Brett's method is that the contiguity requirement is the same for all the bidders; i.e., the algorithm that ensures contiguous seating operates on all the bids; it does not allow each bidder, individually, to specify whether the bidder will accept scattered seats. Similarly, the algorithm does not allow each bidder to specify initially whether partially filled orders are acceptable.

OBJECTS OF THE INVENTION

It is the object of this invention to remedy the above as well as related deficiencies in the prior art. In particular, one object of this invention is to provide an automated method for remotely auctioning tickets that eliminates chaos resulting from cancellation and lowering of previously entered bids.

It is another object of this invention to provide each bidder in a remote ticket auction with automatic means to increase the bid in response to actions of other bidders.

It is yet another object of the invention to allow each participant in a remote auction to bypass the bidding process entirely and ensure purchase of tickets.

It is still another object of the invention to let each bidder in a remote auction to specify, at the time of bidding, whether noncontiguous seating and a partially filled order are acceptable in order to improve the bidder's chances of purchasing a ticket or tickets.

SUMMARY OF THE INVENTION

To fulfill these and other objectives, the present invention provides for a computer-based, remote ticket auctioning method that advises each participant, during the participant's registration with the auction or at some other time before bidding, that each bid represents an unconditional offer to purchase and therefore cannot be lowered or withdrawn. Also during the registration process, the participant provides credit card information, or makes alternative payment arrangements.

The remote auctioning system will accept bids only from registered participants. When bidding, each participant specifies one of four options:

1. Will only accept a full order with contiguous seats;
2. Will only accept a full order, but seats may be scattered;
3. Will accept a partial order, but seats must be contiguous; or
4. No restrictions—will accept a partial order with non-contiguous seats.

At the expiration of the bidding period, the central computer that runs the auction assigns all available tickets so as to maximize total amount received. Thus, selecting options 2–4 increases the participant's chances of obtaining the tickets at the bid amount because, for example, single seats may be filled.

To obviate the need for each bidder to check periodically the status of the bids, this invention provides a "proxy bid" (100)—a way for the participant to enter the initial bid is to agree to a predetermined, bid increment, and the maximum amount of the bid. The proxy then increases the participant's bid automatically, to ensure purchase of tickets, up to the maximum bid amount. Alternatively, if available, the participant may choose the "buy now" function to purchase the tickets immediately, albeit at a high predetermined price.

DETAILED DESCRIPTION OF THE INVENTION

Figure 1A:
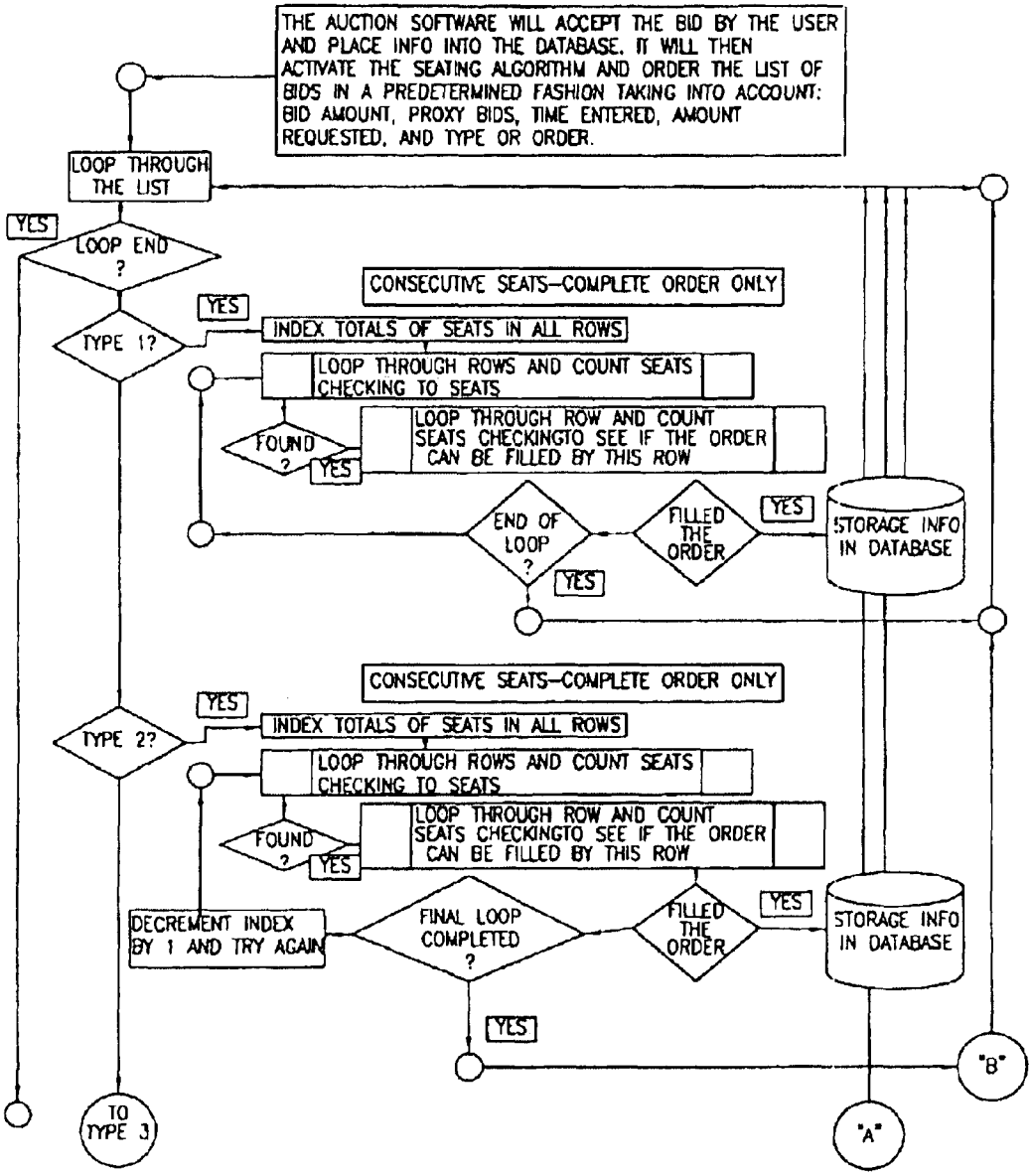
FIGS. 1A & 1B depict a flow chart of a preferred Internet-based implementation of the remote auction in accordance with this invention.
Figure 1B:
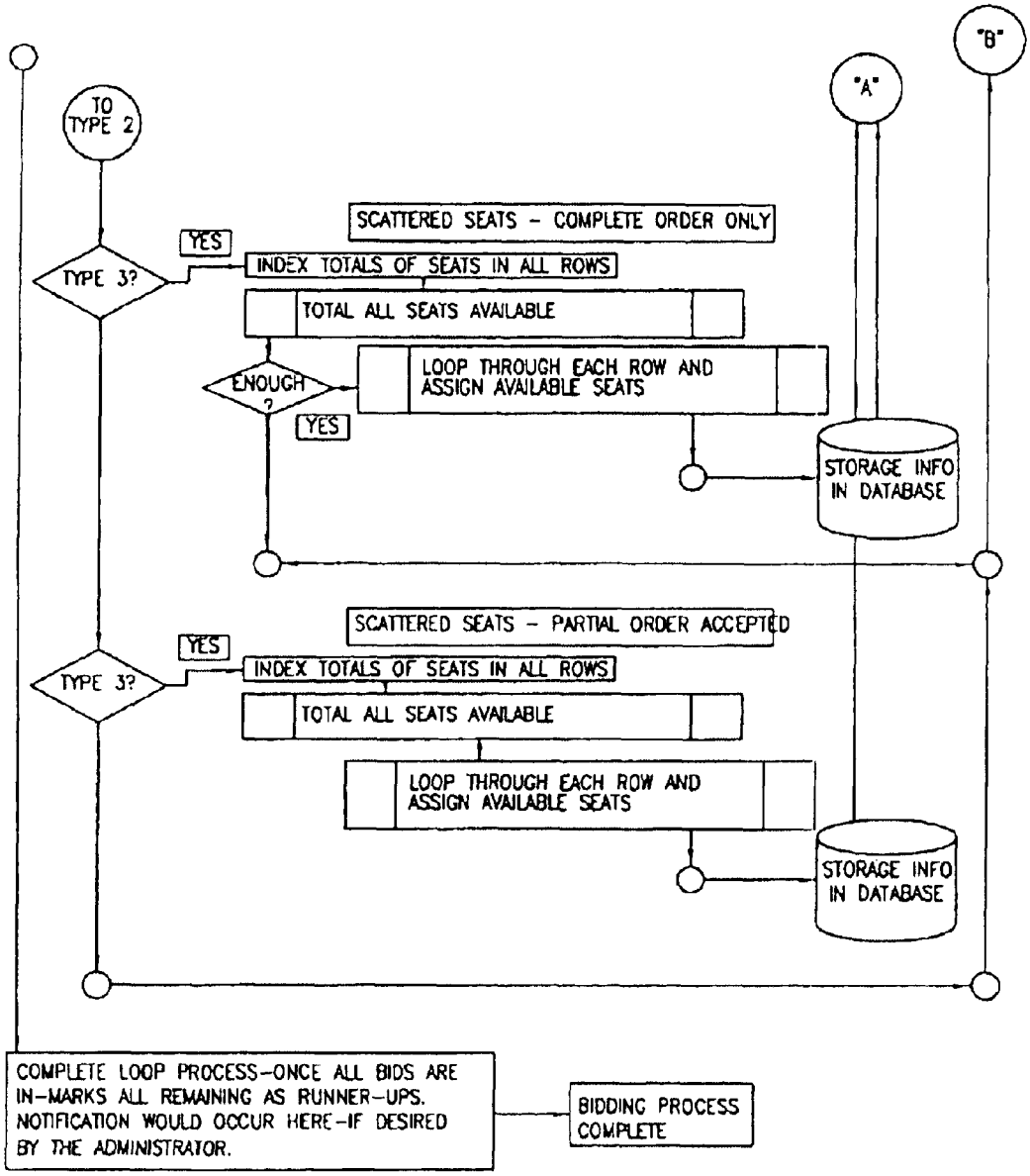

According to the method of this invention, producers of entertainment events transmit the following information to the central computer (101) that implements the method:

1. A seating chart (102) of a theater or stadium ("auditorium");
2. Seats to be auctioned;
3. Available performance dates (100);
4. Current price schedules (108) for different sections (110) of the auditorium; and
5. Deadline (112) for accepting offers.

The ticket seller of the auction may break the available seats for the same event into multiple auctions, and thereby further minimizing scalping.

Templates (114) for the auditorium are obtained before an auction and stored on the central computer (100). The best sources I know for these templates (114) are the following books: Sandy Millman, SEATS (for New York area), and Denise Cady, GOOD SEATS (for Los Angeles and Chicago). The template (114) is displayed to the general public on the auction's Web site (116).

When a potential customer (potential auction participant or bidder) visits the site, the customer is given the options of registering (118), logging-in (129), or browsing (122) the site. If the customer chooses to register, he will be prompted to enter identifying and billing information (124). Typical data (126) requested are:

1. Log-In Name;
2. Password;
3. Name (first, last);
4. Address;
5. Telephone Number (voice, fax);
6. Credit Card Information (brand, expiration date); and
7. Email Address.

After registering, the customer returns to the main page (128) of the web site. Registered (118) and non-registered browsing (122) customers can first click on a one of the available geographical locations (128), e.g., a State, which can potentially be anywhere in the world. Typical geographical choices presented are:

New York,
California,
Nevada,
Florida, and
Illinois.

Then the customer can indicate the type of event (13) he wishes to attend by clicking on an appropriate symbol, such as:

Concerts,
Theater,
Opera,
Dance Performances,
Sports, or
First Run Movies.

The list of available events (13) in the category selected for that particular date (106) is displayed next. Assume, for example, that the customer selected "Theaters" in "New York." If available, the following shows would be listed:

Phantom of the Opera,
Les Miserables,
Chicago,
Rent,
Lion King.

The customer then selects the desired performance date (132) and goes to the next page. Upon clicking on a specific event (130), a seating chart (102) appears. Available seats (104) being auctioned will be listed, also base (minimum) prices (134) for bidding.

If a given event is of interest to the customer, the customer indicates how many seats are desired. The amount needed to bid per seat (136) is displayed to the customer. Note that the per-seat amount may depend on the number of seats desired: if there are a hundred seats available and someone wants 6 seats, he might have to bid more per seat than someone who bids for one seat, depending upon bids already placed.

Only registered customers (118) are allowed to bid, and no one may bid an amount less than what is required to secure a ticket at the time of the bid. That minimum amount can of course increase as higher bids are received.

At this time, the customer may be asked if he would like to increase the bid automatically by predetermined increments up to a certain amount if he is outbid. This is the "proxy bid" (100) service described earlier.

An order form is next presented to the customer. The form requests the following information:

1. Number of tickets (138) desired to be purchased;
2. Amount bid per ticket;
3. If the bidder would be willing to accept non-contiguous seats (146) (optional);
4. If the bidder would accept a partial order (148) (optional).

To make bidding decisions more informed, the following data can be made available to all browsers: (1) bidding history (150), and (2) a running clock (152) indicating how long bidding will continue. Based on this information, the bidder may increase his bid at any time; the bid, however, may not be canceled or decreased.

For those customers who absolutely "must" have the tickets, a way to bypass the auction may be provided. For example, the central computer may be programmed to accept bids at some predetermined amount (154), at the time the bid is made, and to reserve the seats immediately.

The next screen displayed to the customer shows a detailed summary (156) of the order and what the order will cost if and when accepted, including service charges, if any. The computer asks the customer to confirm that (1) the bid is correct, and (2) the total charge is accurate and is authorized by the customer. The specifics (158) of the desired transaction are displayed to the customer to avoid any misunderstanding of expenses. If the information is accurate, the customer advances to the next screen, which asks for another confirmation:

Do You Wish To Use The Credit Card On File?

If yes, processing the bid is a simple matter; otherwise, new credit card data is requested on a new screen, and the customer is asked if he wishes to use the new credit card as the means for future payments.

When the bid is complete, the customer is given a confirmation code (160) so that at any time prior to the close of the auction the status of the desired seats can be obtained and the bid can be raised. Registered participants are able to access all current and past orders (164). As described above, the customer can also elect to have the "proxy bid" increase the customer's bid automatically at preestablished increments up to a certain amount.

Throughout the process, each customer is repeatedly reminded that the bids are commitments to purchase tickets, and are binding if accepted.

After a given offer is submitted, the customer will have the options of bidding on a different event (168), exiting the site, and purchasing related materials (170). Under the last option, links can be provided to sites (172) selling, for example, music CDs and memorabilia.

Before exiting the site, the customer is asked if he would like to receive e-mail notifications (174) of other events. If so, a form listing the types of events of interest is presented to the customer.

When the time allotted for bidding expires, the central computer runs an algorithm (176) that determines the winning bids so as to maximize the total amount realized from ticket sales. Note that the algorithm does not necessarily allocate the seats to the highest bidders; a higher bid can be bypassed in favor of a lower bid when the total realized amount is increased by accepting the lower bid. This generally happens when some lower bid is made by someone willing to take a partial order or noncontiguous seats. Thus, a bidder willing to accept noncontiguous seats or partial orders improves his chances of obtaining the tickets.

The customer's credit card (178) is billed prior to seats being allocated.

After completing the auction, the auction site's operator submits a list of customers and seat allocations to the event's producer/operator. Each successful bidder is notified by e-mail that (1) he has won the bid on "x" seats, (2) the exact amount charged against the customer's credit card, (3) a special code (180) that will uniquely identify the successful bidder to the event's operator, and (4) a reminder (182) that the e-mail should be printed and brought to the box office (184) along with identification. If the tickets are a gift, the box-office must be notified who will be retrieving the tickets. If the ticket purchase was a phone order, the customer is notified by phone under the same protocol.

The box office prints the tickets with the amounts for which they were purchased, which of course are the amounts of the winning bids. This should preclude any charge that the tickets have been scalped; when tickets are scalped, they are sold for an amount higher than the price printed on them. It will also allow the event's producer to verify the amounts for which the tickets were sold.

Three days after the event, the event's producer will be paid the contractual amount, for example the base ticket price plus one half of the amount over the base price, less pro-rated credit card charges. If the event is canceled, refunds are automatically given to the customers, and the producers are charged all credit card fees.

All information exchanges described in this document can also be made via telephones. It is, however, less cost efficient and more cumbersome than using the Internet.

Although a number of specific features have been described in this specification, those skilled in the art will be able to devise various other modifications that although not explicitly described or shown herein, embody the principles of the invention and are thus within its spirit and scope.

I claim:

1. A method for conducting a remote auction of event tickets from a central computer to a plurality of customers at remote locations, each said customer connected to the central computer by *a* telecommunications apparatus for receiving and transmitting information, the method comprising [the steps of]:

programming the *central* computer with a template of an auditorium where [the] *an* event is scheduled to take place;

programming the *central* computer with available seat data, the *available* seat data identifying seats intended for sale during the *remote* auction, each of the seats intended for sale corresponding to a ticket;

programming the computer with a minimum ticket price below which no ticket may be sold during the *remote* auction;

transmitting from the central computer to the customers, before the [individual] customer*s* register[s] and before said customer*s* makes any bids, a first message to notify the customer*s* that bids submitted by the customer*s* during the *remote* auction are non-revocable;

further transmitting from the central computer to the customers a message that customers can individually specify that partial orders and scattered seats are acceptable;

requesting registration information from at least a first customer *of the plurality of customers*, the registration information, including [the first customer's name,] *a name of the first customer, a* password, and payment information*, for* registering the first customer for the auction;

receiving bids from at least two of the *plurality of* customers, each of the bids including a seat quantity indicating a number of seats bid for, an amount bid, [means indicating] *an indication of* whether the customer who submitted said each bid is willing to accept noncontiguous seats, and *an indication of* whether the [consumer] *customer* who submitted *said* each bid is willing to accept fewer seats than indicated by said [each bid's seat quantity, and] *number of seats bid for; and* performing in a computer a seat assignment algorithm for allocating the seats intended for sale during the *remote* auction among the received bids and incorporating at least one of [the] *a* customer's [indication of] willingness to accept noncontiguous seats and *the customer's*

*willingness to accept a* partial order[s] in a way that maximizes *a* total amount receivable from the *plurality of* customers for the seats intended for sale during the *remote* auction.

2. [A] *The* method according to claim 1, further [including the step of] *comprising* notifying each customer who submitted at least one bid of *a status of* the [submitted bid's status] *at least one bid*, said status including a notification of a first number of seats allocated to the [submitted] *at least one* bid, a first amount equal to [the] *a* cost of [the] seats allocated to the [submitted] *at least one* bid, and a unique identifier of the [submitted] *at least one* bid.

3. [A] *The* method according to claim 1, further [including the step of] *comprising* informing each customer of a current minimum bid amount that the customer must bid to qualify for seat allocation.

4. [A] *The* method according to claim 1, further [including the steps of:] *comprising:* setting a guaranteed purchase amount for the [tickets] *seats* intended for sale during the *remote* auction, and enabling the *first* customer to purchase one or more [tickets,] *seats,* without participating in the *remote* auction, at the guaranteed purchase amount.

5. [A] *The* method according to claim 1, further [including the step of] *comprising* enabling a [first] customer who submitted a first bid to engage a proxy bid means for automatically increasing the first bid by a predetermined increment up to a first limit.

6. [A] *The* method according to claim 1, further [including the step of] *comprising* sending from the central computer to the telecommunications apparatus, a graphical representation of the template and the available seat [date] *data*.

7. [A] *The* method according to [any one of] claim[s] 1[–6], wherein the central computer and the telecommunications apparatus are connected via the Internet, *wherein* said [steps of] transmitting *of the first message*, [registering,] *said transmitting of the second message, said requesting registration information, and said* receiving bids[, notifying, and informing] are performed through the Internet[, and the step of registering the customers includes the step of receiving a second customer's name, password and payment authorization].

8. A system for conducting a remote auction of event tickets, the system comprising:

a central computer, the central computer including:

means for communicating with a plurality of customers at remote locations;

means for receiving and storing a template of an auditorium where [the] *an* event is scheduled to take place;

means for receiving and storing available seat data *for the event*, the seat data identifying seats intended for sale during the *remote* auction, each of the seats intended for sale corresponding to a different ticket;

means for receiving and storing a minimum ticket price below which no ticket may be sold during the *remote* auction;

means for transmitting from the central computer to the *plurality of* customers a message that customers can individually specify that partial orders and scattered seats are acceptable;

means for requesting registration information from a first customer, the registration information [information;] including *a name of* the first customer['s name], *a* password, and payment information;

means for receiving the requested registration information;

means for receiving bids, each bid including a seat quantity data item indicating a number of seats bid for, [the] *a bid* amount [bid field], [means indicating] *an indication of* whether [the] *a* customer who submitted said each bid is willing to accept noncontiguous seats, and [means indicating] *an indication of* whether the customer who submitted said each bid is willing to accept *a* partial order[s than indicated by said each bid's seat quantity,] *which differs from the number of seats bid for; and* means for performing a seat assignment algorithm for allocating the seats intended for sale during the *remote* auction among the received bids, wherein at least one of [the] *a* customer's indication of willingness to accept noncontiguous seats and *the customer's indication of willingness to accept* partial orders is incorporated such that [the] *a* total amount receivable [from the customers] for the seats intended for sale during the *remote* auction is maximized.

*9. A method for conducting an auction using a central computer in communication with a plurality of customers through one or more telecommunications apparatuses, the method comprising:*

*providing a first message from the central computer to a first customer, wherein the first message indicates that submitted bids are non-revocable, and further wherein the first message is provided to the first customer prior to registration of the first customer and prior to receipt of a bid from the first customer;*

*receiving registration information from the first customer;*

*providing a second message from the central computer to the first customer, wherein the second message indicates that the first customer is allowed to specify that a partial order is acceptable and that non-contiguous seats are acceptable;*

*providing event information to the first customer, wherein the event information corresponds to an event and includes a minimum bid amount;*

*receiving a first bid from the first customer, wherein the first bid includes a desired number of tickets, a bid amount, an indication of whether partial orders are acceptable, and an indication of whether non-contiguous seats are acceptable; and*

*implementing, with a central computer, a computerized seat algorithm to determine whether the first bid is accepted, wherein the computerized seat assignment algorithm is configured to maximize a total amount received for ticket sales associated with the event by incorporating at least one of an affirmative indication that partial orders are acceptable or an affirmative indication that non-contiguous seats are acceptable.*

*10. The method of claim 9, further comprising providing the first customer with a template of a venue where the event is scheduled to take place.*

*11. The method of claim 9, wherein the event information further comprises available seat data.*

*12. The method of claim 9, wherein the event information further includes a deadline for submitting bids corresponding to the event.*

*13. The method of claim 9, wherein the minimum bid amount is based at least in part on a number of tickets available.*

*14. The method of claim 9, wherein the minimum bid amount is based at least in part on the desired number of tickets.*

*15. A system for conducting a remote auction of event tickets, the system comprising:*

*a central computer including*

*means for receiving registration information from a first customer;*

*means for providing from the central computer the first customer with a message indicating that the first customer is allowed to specify that a partial order is acceptable and that non-contiguous seats are acceptable;*

*means for providing event information to the first customer, wherein the event information corresponds to an event and includes a minimum bid amount for tickets to the event;*

*means for receiving a plurality of bids on the tickets to the event from a plurality of customers, wherein the plurality of bids includes a first bid from the first customer, wherein the first bid includes a desired number of tickets, a bid amount, an indication that partial orders are acceptable to the first customer, and an indication that non-contiguous seats are acceptable to the first customer; and*

*means for performing a computerized seat assignment algorithm to allocate the tickets to the plurality of customers such that a total dollar amount received is maximized, wherein the tickets are allocated based on at least one of the indication that partial orders are acceptable to the first customer or the indication that non-contiguous seats are acceptable to the first customer.*

*16. The system of claim 15, wherein the central computer further comprises:*

*means for receiving a template of a venue where the event is scheduled to take place; and*

*means for providing the template to the first customer.*

*17. The system of claim 15, wherein the first bid comprises a proxy bid that specifies a limit, and further wherein the central computer comprises means for automatically increasing the bid amount by a predetermined increment up to the limit.*

*18. The system of claim 15, wherein the bid amount comprises a guaranteed purchase amount such that the first customer is guaranteed the desired number of tickets.*

* * * * *